(12) United States Patent
Jibu et al.

(10) Patent No.: US 8,345,355 B2
(45) Date of Patent: Jan. 1, 2013

(54) LENS AND METHOD FOR MANUFACTURING SAME

(75) Inventors: Yasuomi Jibu, Ichinomiya (JP); Yasuhiro Ideno, Seto (JP); Junji Fujitani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 41 days.

(21) Appl. No.: 13/072,730

(22) Filed: Mar. 27, 2011

(65) Prior Publication Data

US 2011/0242671 A1 Oct. 6, 2011

(30) Foreign Application Priority Data

Mar. 31, 2010 (JP) .................... 2010-081925

(51) Int. Cl.
*G02B 13/18* (2006.01)
*G02B 3/02* (2006.01)
*G02B 3/00* (2006.01)

(52) U.S. Cl. ...................... 359/718; 264/1.32
(58) Field of Classification Search .......... 359/642, 359/718, 719; 264/1.1, 1.32
See application file for complete search history.

(56) References Cited

U.S. PATENT DOCUMENTS

| | | | |
|---|---|---|---|
| 5,995,304 A * | 11/1999 | Nomura et al. | 359/726 |
| 6,144,505 A | 11/2000 | Nakanishi | |
| 7,450,313 B2 | 11/2008 | Honda | |
| 7,898,739 B2 | 3/2011 | Hayashi et al. | |
| 2005/0152045 A1 | 7/2005 | Honda | |
| 2009/0073580 A1 | 3/2009 | Hayashi et al. | |

FOREIGN PATENT DOCUMENTS

| | | |
|---|---|---|
| JP | S62-196601 A | 8/1987 |
| JP | H06-059103 A | 3/1994 |
| JP | 2000-000856 A | 1/2000 |
| JP | 2002-187168 A | 7/2002 |
| JP | 2005-195844 A | 7/2005 |
| JP | 2009-069672 A | 4/2009 |
| JP | 2009-184241 A | 8/2009 |

OTHER PUBLICATIONS

Japan Patent Office, Decision of Grant for Patent for Japanese Patent Application No. 2010-081925 (counterpart Japanese patent application), mailed Aug. 21, 2012.

\* cited by examiner

*Primary Examiner* — William Choi
(74) *Attorney, Agent, or Firm* — Baker Botts L.L.P.

(57) ABSTRACT

A lens including a lens portion having two opposite oblong surfaces at least one of which is a curved lens surface having a refractive power is disclosed. At both ends in a longitudinal direction of the lens portion, first and second flange portions are provided each of which tapers toward the lens portion and has a slant surface slanting with respect to the longitudinal direction of the lens portion and connected with one of the oblong surfaces. An angle of the slant surface of the first flange portion with respect to the longitudinal direction of the lens portion is different from an angle of the slant surface of the second flange portion with respect to the longitudinal direction of the lens portion.

5 Claims, 8 Drawing Sheets

LENS AND METHOD FOR MANUFACTURING SAME

CROSS-REFERENCE TO RELATED APPLICATION(S)

This application claims priority from Japanese Patent Application No. 2010-081925 filed on Mar. 31, 2010, the disclosure of which is incorporated herein by reference in its entirety.

FIELD

The present invention relates to a long-length lens, and a method for manufacturing the lens.

BACKGROUND

A lens including a lens portion having two opposite oblong lens surfaces, and two flange portions provided at both ends in a direction of a length of the lens portion is known in the art. Each flange portion of this lens tapers toward the lens portion and has a slant surface which slants with respect to the direction of the length of the lens portion and is connected with one of the oblong surfaces. More specifically, the slant surfaces of the two flange portions slant at the same angle, particularly, a steep angle approximate to the right angle, with respect to the direction of the length of the lens portion.

However, such steeply angled flange portions designed to protrude in a direction almost perpendicular to the direction of the length of the lens portion would be disadvantageous in that a cavity surface of a mold contoured to correspond to each slant surface could possibly become obstructive, during manufacture of the lens, to the flow of resin material injected from a gate of the mold formed at a position of the cavity corresponding to an outer end of one flange portion facing outward in a direction of a length of the flange portion. This would make it difficult to mold the lens surfaces precisely.

There is a need to provide a lens and a method for manufacturing a lens which can contribute to the improved flowability of resin or other material during manufacture of the lens.

SUMMARY

In one aspect, there is provided a lens which comprises a lens portion, and first and second flange portions. The lens portion has two opposite oblong surfaces, at least one of which is a curved lens surface having a refractive power. The first and second flange portions are provided at both ends in a longitudinal direction of the lens portion. Each flange portion tapers toward the lens portion and has a slant surface. The slant surface slants with respect to the longitudinal direction of the lens portion and is connected with one of the oblong surfaces. An angle of the slant surface of the first flange portion with respect to the longitudinal direction of the lens portion is different from an angle of the slant surface of the second flange portion with respect to the longitudinal direction of the lens portion.

In another aspect, a method for manufacturing a lens is provided. The lens includes a lens portion having two opposite oblong surfaces at least one of which is a curved lens surface having a refractive power, and first and second flange portions provided at both ends in a longitudinal direction of the lens portion. Each flange portion tapers toward the lens portion and has a slant surface slanting with respect to the longitudinal direction of the lens portion and connected with one of the oblong surfaces. This method comprises the steps of: providing a mold having a cavity surface contoured to form the lens; and pouring a material for the lens into the mold, whereby the lens is molded. The cavity surface of the mold used in this method includes a first slant cavity surface corresponding to the slant surface of the first flange portion of the lens and a second slant cavity surface corresponding to the slant surface of the second flange portion of the lens, and the first and second slant cavity surfaces form first and second angles, respectively, with respect to a longitudinal direction of a cavity corresponding to the lens portion, and the first and second angles are different from each other.

BRIEF DESCRIPTION OF THE DRAWINGS

The above aspects, their advantages and further features of the present invention will become more apparent by describing in detail illustrative, non-limiting embodiments thereof with reference to the accompanying drawings, in which.

DESCRIPTION OF EMBODIMENTS

A detailed description will be given of an illustrative embodiment of the present invention with reference made to the drawings where appropriate. In the following description, a general setup of an image forming apparatus in which an optical scanner including a lens according to the present embodiment is provided will be described at the outset, and then structural features of the lens will be described in detail.

<General Setup of Laser Printer>

Figure 1:
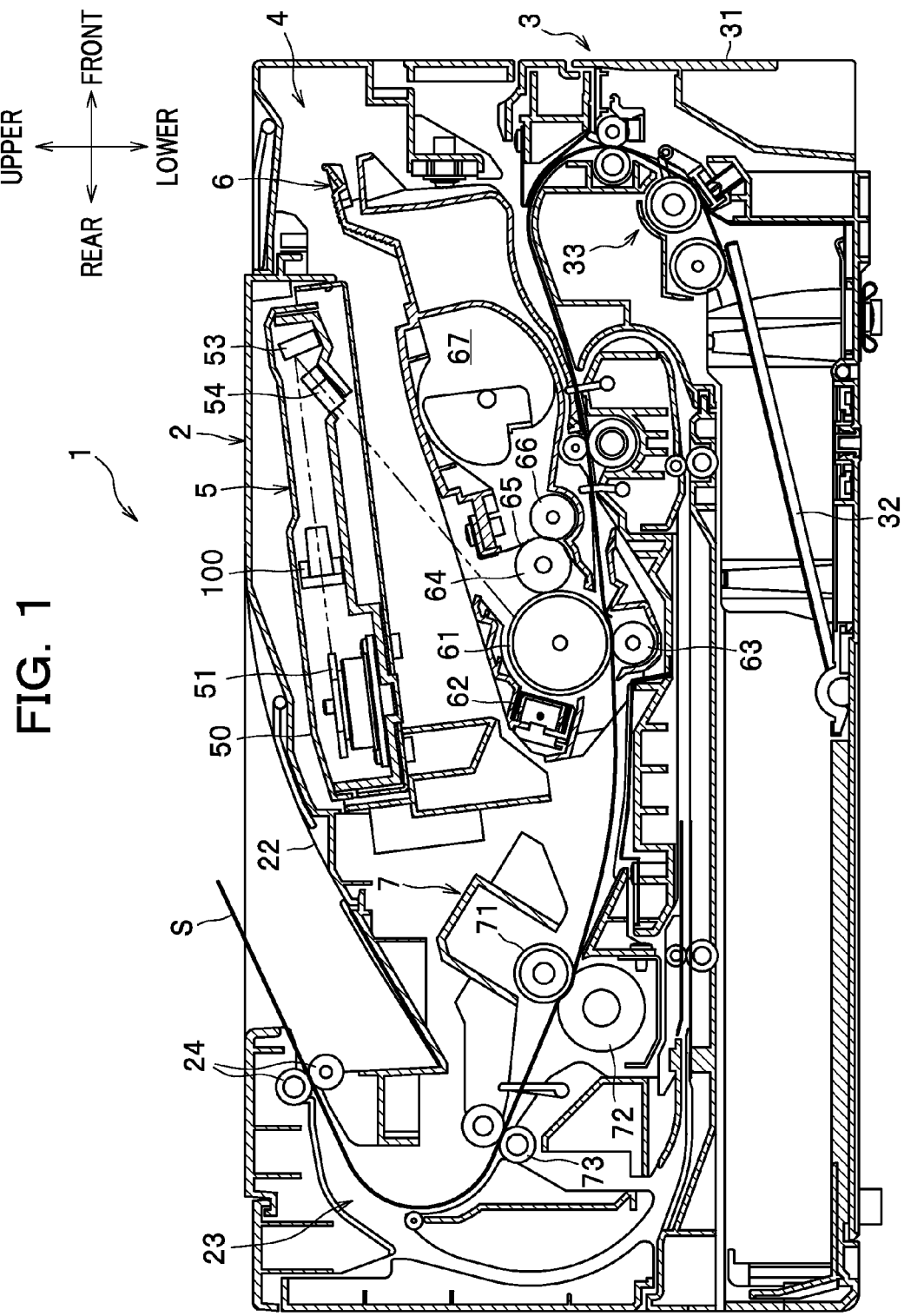
FIG. 1 is a schematic diagram of a laser printer which includes an fθ lens as one example of a lens according to an illustrative embodiment.

As shown in FIG. 1, a laser printer 1 (image forming apparatus) comprises a body casing 2, and several components housed within the body casing 2 which principally include a sheet feeder unit 3 for feeding a sheet S (e.g., of paper), and an image forming unit 4 for forming an image on the sheet S.

Hereinbelow, in describing the arrangement and operation of each component in the laser printer 1, the direction is designated as from the viewpoint of a user who is using (operating) the laser printer 1. To be more specific, in FIG. 1, the right-hand side of the drawing sheet corresponds to the "front" side of the printer, the left-hand side of the drawing sheet corresponds to the "rear" side of the printer, the front side of the drawing sheet corresponds to the "left" side of the printer, and the back side of the drawing sheet corresponds to the "right" side of the printer. Similarly, the direction of a line extending from top to bottom of the drawing sheet corresponds to the "vertical" or "up/down (upper/lower or top/bottom)" direction of the printer.

The sheet feeder unit 3 is disposed in a lower space inside the body casing 2, and principally includes a sheet feed tray 31, a sheet pressure plate 32 and a sheet conveyor mechanism 33. In the sheet feeder unit 3, sheets S in the sheet feed tray 31 are pressed upwardly by the sheet pressure plate 32, and each sheet S separated from the others is conveyed by the sheet conveyor mechanism 33 into the image forming unit 4.

The image forming unit 4 principally includes an optical scanner 5, a process cartridge 6, and a fixing unit 7.

The optical scanner 5 is disposed in an upper space inside the body casing 2, and comprises a substantially boxlike housing 50, and several components housed within the housing 50 which principally include a laser light source (not shown), a polygon mirror 51, an fθ lens 100 as one example of a lens, a reflecting mirror 53, and a cylindrical lens 54.

The polygon mirror 51 is shaped generally like a hexagonal column with six sides consisting of reflecting surfaces. The polygon mirror 51 spins at high speed and reflects a laser beam (see alternate long and short dashed lines) from the laser light source to cause the laser beam to change its direction along the main scanning direction so that the laser beam sweeps with constant angular velocity.

The fθ lens 100 is a scan lens through which the laser beam caused to change its direction and sweep by the polygon mirror 51 travels. In the fθ lens 100, the laser beam caused to sweep with constant angular velocity by the polygon mirror 51 is converted into a laser beam which sweeps with constant linear velocity. A detailed description of the fθ lens 100 will be given later.

The reflecting mirror 53 is configured to reflect the laser beam which has passed through the fθ lens 100 so that the laser beam is turned back toward the cylindrical lens 54.

The cylindrical lens 54 is a scan lens through which the laser beam reflected off the reflecting mirror 53 travels. In the cylindrical lens 54, the laser beam is refracted and converged in the sub-scanning direction.

In this optical scanner 5, a laser beam regulated according to image data and emitted from the laser light source reflects off or passes through the components, i.e., polygon mirror 51, fθ lens 100, reflecting mirror 53 and cylindrical lens 54, in this order, so that a peripheral surface of the photoconductor drum 61 is rapidly scanned (illuminated) with the laser beam.

The process cartridge 6 is disposed under the optical scanner 5, and configured to be installable in and removable from the body casing 2 through an opening which is formed when a front cover (not designated by reference numeral) provided at the body casing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the peripheral surface of the photoconductor drum 61 is uniformly charged by the charger 62, and then exposed to a rapidly sweeping laser beam from the optical scanner 5, so that an electrostatic latent image corresponding to the image data is formed on the peripheral surface of the photoconductor drum 61. Toner in the toner reservoir 67 is supplied via the supply roller 66 onto the developing roller 64, and passes through between the developing roller 64 and the doctor blade 65, so that a thin layer of toner having a predetermined thickness is carried on the developing roller 64.

The toner carried on the developing roller 64 is supplied from the developing roller 64 to the electrostatic latent image formed on the peripheral surface of the photoconductor drum 61. In this way, the electrostatic latent image is visualized and a toner image is formed on the peripheral surface of the photoconductor drum 61. Thereafter, a sheet S is conveyed through between the photoconductor drum 61 and the transfer roller 63, so that the toner image carried on the photoconductor drum 61 is transferred onto the sheet S.

The fixing unit 7 is disposed rearwardly of the process cartridge 6, and principally includes a heating roller 71 and a pressure roller 72 disposed opposite to the heating roller 71 to be pressed against the heating roller 71. In the fixing unit 7, the toner image transferred on the sheet S is thermally fixed on the sheet S while passing through between the heating roller 71 and the pressure roller 72. The sheet S with the toner image thermally fixed thereon is conveyed by conveyor rollers 73 along a sheet conveyor path 23 and ejected out from the sheet conveyor path 23 onto a sheet output tray 22 by output rollers 24.

<Detailed Structure of fθ Lens>

Next, a detailed structure of the fθ lens 100 will be described hereafter.

Figure 2:
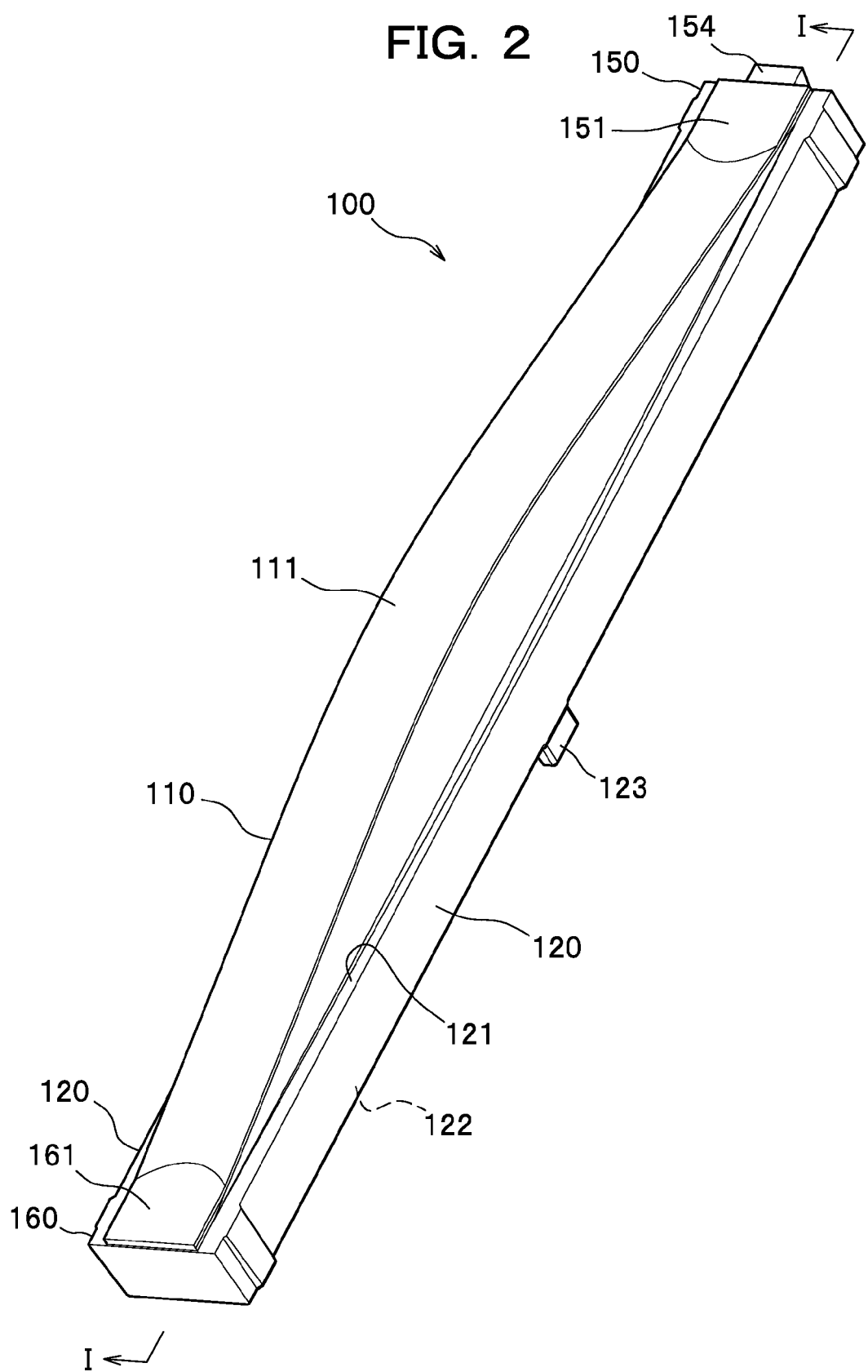
FIG. 2 is a perspective view of the fθ lens.

As shown in FIG. 2, the fθ lens 100 includes a lens portion 110, a pair of rib portions 120, a first flange portion 150 and a second flange portion 160. The lens portion 110 has two opposite oblong lens surfaces 111, 112 (see also FIG. 3) each having a refractive power such that a laser beam passing through these lens surfaces 111, 112 of the lens portion 110 is refracted. Each of these oblong lens surfaces 111, 112 of the lens portion 110 is shaped generally like a rectangle having two opposite longer sides (extending in a direction of its length) and two opposite shorter sides (extending in a direction of its width) as viewed from an optical axis direction. The rib portions 120 are provided to protrude outward from two opposite sides of the lens portion 110 which face in the direction of the widths of the oblong lens surfaces 111, 112. The first and second flange portions 150, 160 are provided at both ends (two opposite sides which face in the direction of the length) of the lens portion 110 which extend between the corresponding shorter sides of the oblong lens surface 111, 112.

The fθ lens 100 arranged in the optical scanner 5 is oriented such that a direction of the lengths of the oblong lens surfaces 111, 112 (or direction of the length of the lens portion 110) is aligned with the main scanning direction in which the laser beam is caused to sweep. The direction perpendicular to the direction of the lengths of the oblong lens surfaces 111, 112 and to the optical axis direction is herein referred to as a direction of the widths of the oblong lens surfaces 111, 112. The direction of the length of the lens portion 110 will be referred to as "longitudinal direction" of the lens portion 110.

Figure 3:
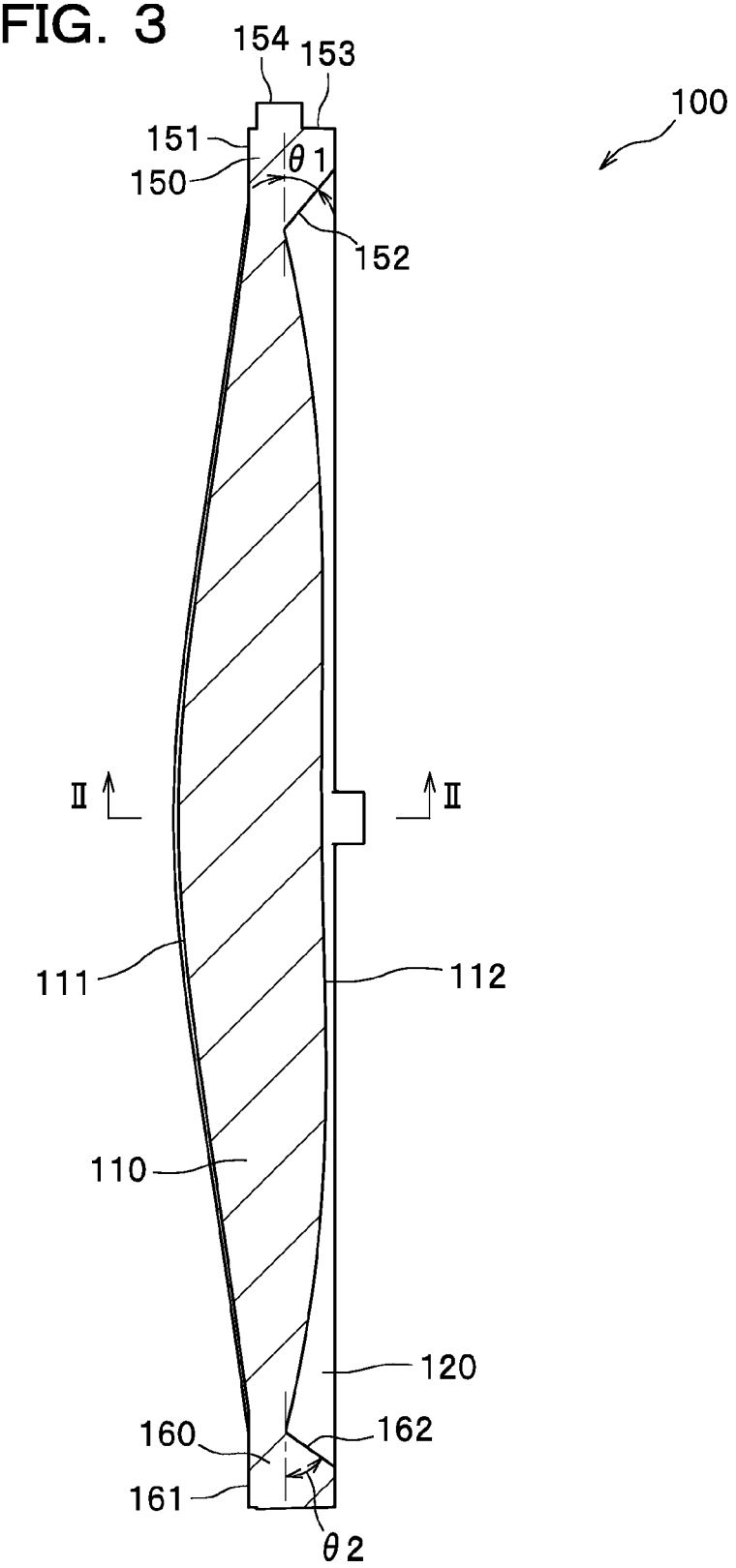
FIG. 3 is a sectional view taken along line I-I of FIG. 2.

As best seen in FIG. 3, each of the oblong lens surfaces 111, 112 of the lens portion 110 is configured to be a convex surface that curves outward along the length with a portion closer to a center in the direction of the length of each oblong lens surface 111, 112 between two opposite shorter sides thereof being located farther toward outside than portions closer to the shorter sides (both ends facing outward in the direction of the length) of the oblong lens surface 111, 112.

Figure 4:
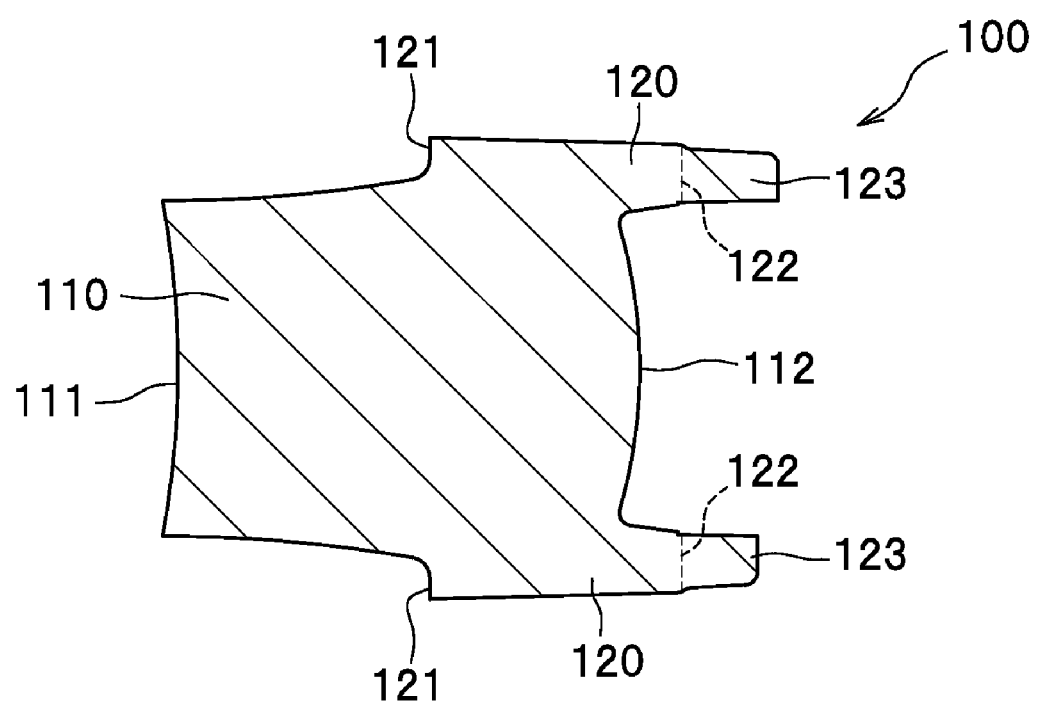
FIG. 4 is a sectional view taken along line II-II of FIG. 3.

As best seen in FIG. 4, the oblong lens surface 111 which is the surface facing to the front in the optical axis direction (i.e., located at the foreside from which a laser beam traveling through the lens portion 110 goes out) is further configured to be a concave surface as viewed in cross section (taken along each plane perpendicular to the longitudinal direction of the lens portion 110) that curves inward with a portion closer to a center in the direction of the width of the oblong lens surface 111 (in the middle portion between two opposite longer sides thereof) being located deeper toward inside than portions closer to the longer sides of the oblong lens surface 111. On the other hand, the oblong lens surface 112 which is the surface facing to the back in the optical axis direction (i.e., located at the backside from which a laser beam enters the lens portion 110) is further configured to be a convex surface as viewed in cross section (taken along each plane perpendicular to the longitudinal direction of the lens portion 110) that curves outward with a portion closer to a center in the direction of the width of the oblong lens surface 112 being located farther toward outside than portions closer to the longer sides of the oblong lens surface 112.

As shown in FIG. 2, the rib portions 120 are formed on the both sides of the lens portion 110 facing toward the direction of the widths of the oblong lens surfaces 111, 112, and extend in the longitudinal direction of the lens portion 110. To be more specific, as shown in FIG. 4, each rib portion 120 is disposed in a position separate from the oblong lens surface 111 (i.e., one of the lens surfaces facing to the front in the optical axis direction) and protrudes outward in the optical axis direction beyond the oblong lens surface 112 (i.e., the other of the lens surfaces facing to the back in the optical axis direction).

With this configuration in which the rib portion is not provided in a position at each longer side of the oblong lens surface 111 facing to the front in the optical axis direction, the amount of material can be reduced in comparison with the conventional configuration in which the rib portion is provided at each longer side of the oblong lens surface facing to the front in the optical axis direction. Accordingly, reduction in the manufacturing cost and in the cooling time is achieved. Furthermore, since the oblong lens surface 111 facing to the front in the optical axis direction is separate from the rib portion, the oblong lens surface 111 is not affected by the shrinkage of material at the rib portion during the molding process. Therefore, the oblong lens surface 111 can be formed with increased precision.

As shown in FIGS. 2 and 4, each rib portion 120 has opposite sides 121, 122 facing outward in the optical axis direction, which sides 121, 122 are flat surfaces extending in the longitudinal direction of the lens portion 110 (see FIG. 2). A projection 123 protruding from each rib portion 120 outward in the optical axis direction is provided at the center in the direction of the length of its side 122.

The projection 123 is a portion which is engaged with a corresponding recess provided in the housing 50 when the fθ lens 100 is mounted to the optical scanner 5 (e.g., in the housing 50 thereof). With the projection 123 engageable with the recess in the housing 50, the fθ lens 100 can be located in place easily in the housing 50. In view of the present invention, the projection 123 is optional, and may be omitted as the case may be.

The first and second flange portions 150, 160 are portions which are designed to be held by clips (not shown) or the like provided in the housing 50 when the fθ lens 100 is mounted to in the optical scanner 5 (to the housing 50). As shown in FIG. 3, the first and second flange portions 150, 160 are configured to taper toward the lens portion 110. To be more specific, the first flange portion 150 has a front side 151 and a first slant surface 152. The front side 151 of the first flange portion 150 is formed as a flat surface extending in a direction perpendicular to the optical axis direction for use in positioning the fθ lens 100. The first slant surface 152 is configured to slant with respect to the longitudinal direction of the lens portion 110 (the first slant surface extending inwardly in the longitudinal direction of the lens portion 110 slants toward the oblong lens surface 111) and is connected with the oblong surface 112. The second flange portion 160 as well has a front side 161 and a second slant surface 162 configured similar to those of the first flange portion 150.

The front sides 151, 161 of the first and second flange portions 150, 160 are disposed adjacent to the shorter sides (the sides facing in the direction of the length) of the oblong lens surface 111 (located at front side in the optical axis direction) along the length of the oblong lens surface 111, and contiguous to the oblong lens surface 111.

The first and second flange portions 150, 160 are configured such that an angle θ1 of the first slant surface 152 of the first flange portion 150 with respect to the longitudinal direction of the lens portion 110 is different from an angle θ2 of the second slant surface 162 of the second flange portion 160 with respect to the longitudinal direction of the lens portion 110. To be more specific, the θ1 of the first slant surface 152 is smaller than the angle θ2 of the second slant surface 162.

With this configuration, when a molten resin material is poured into the mold in the direction of the length of the fθ lens 100 during its manufacture, the flowability of the material flowing through a portion C1 of the cavity (see FIG. 5) corresponding to the first flange portion 150 having the first slant surface 152 which slants at the smaller angle θ1 can be increased. Moreover, since the angle θ2 of the second slant surface 162 is greater than the angle θ1 of the first slant surface 152, the dimension of the second flange portion 160 in the direction of the length of the fθ lens 100 is smaller than the dimension of the first flange portion 150 in the direction of the length of the fθ lens 100. Accordingly, the fθ lens 100 can be designed to be compact in size in the direction of the length thereof in comparison with the configuration in which the both slant surfaces slant at the same angle θ1.

Since the angles θ1, θ2 of the slant surface 152, 162 are different from each other, wrong assemblage of the fθ lens 100 can be prevented in cases for example where a locator part corresponding to each slant surface 152, 162 is provided in the optical scanner 5 (at the housing 50 thereof).

<Method for Manufacturing fθ Lens>

Next, a method for manufacturing the fθ lens 100 will be described hereafter in detail.

Figure 5:
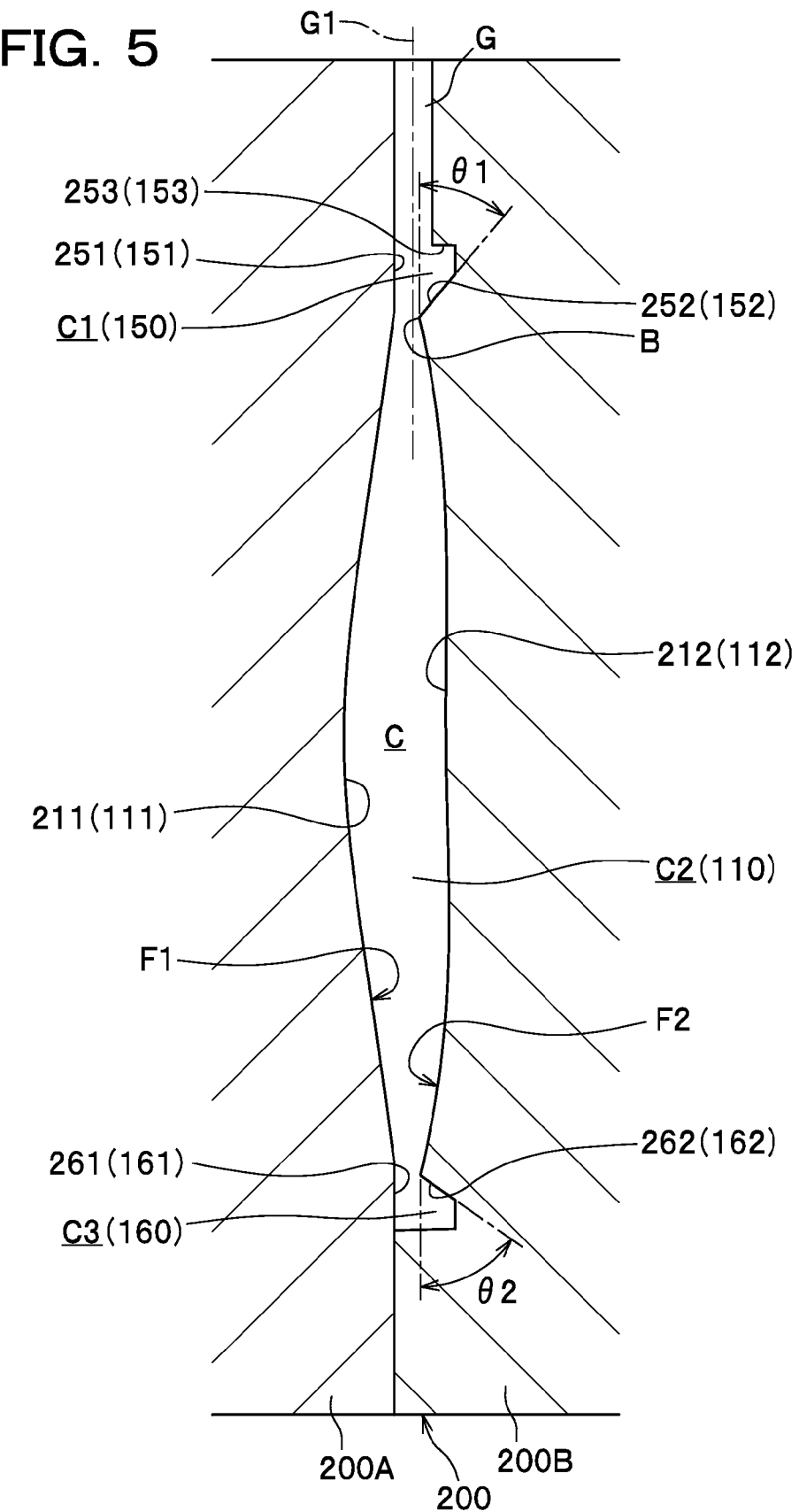
FIG. 5 is a schematic diagram in longitudinal section of a mold for use in manufacture of the fθ lens.
Figure 6:
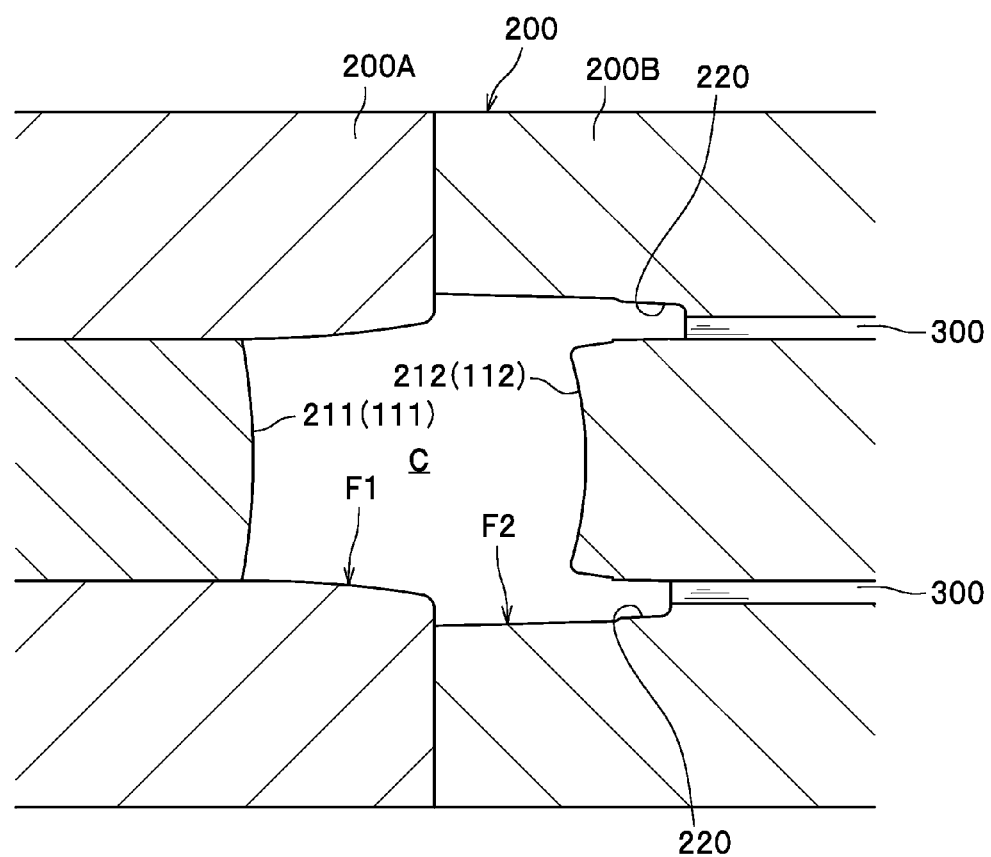
FIG. 6 is a schematic diagram in cross section of the mold of FIG. 5 taken along a plane perpendicular to the direction of the length of the fθ lens at its center.

In the present embodiment, the manufacturing method comprises pouring a molten resin material into a cavity C of a mold 200 as illustrated in FIGS. 5 and 6, and thereafter letting the resin material be solidified, whereby a fθ lens 100 configured as described above is molded. To be more specific, the mold 200 includes a stationary mold 200A and a movable mold 200B that is movable relative to the stationary mold 200A. These stationary and movable molds 200A, 200B have cavity surfaces F1, F2 formed, respectively, which are contoured so that the molds 200A, 200B when combined together form the shape of the fθ lens 100.

As shown in FIG. 5, the cavity surface F2 of the movable mold 200B has a first slant cavity surface 252 corresponding to the first slant surface 152 of the fθ lens 100 and a second slant cavity surface 262 corresponding to the second slant surface 162 of the fθ lens 100. The first slant cavity surface 252 is designed to have an angle θ1 formed with respect to a direction of its length, which angle θ1 is smaller than (i.e., different from) an angle θ2 formed by second slant cavity surface 262 with respect to a direction of its length.

With this configuration, the flowability of the resin material flowing near the first slant cavity surface 252 can be improved.

In the cavity surfaces F1, F2, at a first slant cavity surface 252 side thereof, a flange outside cavity surface 253 is provided which corresponds to an outside surface 153 of the first flange portion 150 of the fθ lens 100 (i.e., the surface facing outward in the longitudinal direction of the lens portion 110; see FIG. 3). A gate G for injecting a molten resin material is provided at this flange outside cavity surface 253.

With this configuration, in which the gate G as a molten resin injection port is provided at the side (flange outside cavity surface 253) closer to the first slant cavity surface 252 slanting at an angle smaller than that at which the second slant cavity surface 262 slants, the structure of a portion of the cavity C at the molten resin injection side is less obstructive to the inflow of the molten resin material in comparison with the configuration in which a slant surface provided at the molten resin injection port side slants at an angle greater than that at which the other slant surface provided at a side opposite thereto slants, so that delay of delivery of the molten resin material throughout the cavity can be reduced. Accordingly, the molten resin can smoothly pervade the cavity C so as to reach every part thereof, which includes cavities C2, C3 corresponding to the lens portion 110 and the second flange portion 160, respectively. As a result, the precision/accuracy of the lens surfaces of the molded fθ lens 100 can be insured.

The cavity surface F2 includes a first oblong cavity surface 212 corresponding to the oblong lens surface 112 (i.e., one of the oblong surfaces located rearward in the optical axis direction of the fθ lens 100), whereas the cavity surface F1 includes a second oblong cavity surface 211 corresponding to the oblong lens surface 111 (i.e., the other of the oblong surfaces located frontward in the optical axis direction of the fθ lens 100). The gate G is configured as a channel having such a rectangular cross section as to form a gate-derived cast portion 154 illustrated in FIG. 2. As shown in FIG. 5, the gate G has its center G1 located, as viewed from the longitudinal direction of the lens portion 110 (i.e., the barycenter of the rectangular cross section of the gate G), in a position shifted away from a junction B of the first slant cavity surface 252 with the first oblong cavity surface 212 toward the second oblong cavity surface 211.

In other words, as viewed from the main scanning direction (i.e., the longitudinal direction of the lens portion 100), the gate G (its minor portion off the center G1) overlaps the junction B.

With this configuration, the flow of the molten resin material passing through the center G1 of the gate G of which the velocity is the fastest is less obstructed by the first slant cavity surface 252, and thus the flowability of the molten resin material is further improved.

In addition, the junction B of the first slant cavity surface 252 and the first oblong cavity surface 212 is curved. To be more specific, the radius of curvature of the curved junction B may, for example, be 0.3 mm or so. With this additional feature, the flowability of the molten resin material flowing through the cavity C can be increased more in comparison with an alternative configuration in which the junction is not curved but angulated.

The stationary mold 200A has two flat surface forming cavity surfaces 251, 261 corresponding to the front sides 151, 161, respectively, which are utilized to locate the fθ lens 100 in place. The flat surface forming cavity surfaces 251, 261 are formed integrally and contiguously with the second oblong cavity surface 211. With these flat surface forming cavity surfaces 251, 261, the accuracy/precision in the relative position can be improved between the oblong lens surface 111 of the fθ lens 100 and the front sides 151, 161 for use in positioning the fθ lens 100.

As shown in FIG. 6, the movable mold 200B has a pair of rib forming cavity surfaces 220 each contoured to form a recessed (furrow-like) shape corresponding to the rib portion 120. To be more specific, as represented in FIG. 6 which shows a cross section taken along a direction perpendicular to the longitudinal direction of the lens portion 110, the rib forming cavity surfaces 220 are formed only at the movable mold 200B. At the stationary mold 200A, in contrast, only the second oblong cavity surface 211 as described above and sidewall forming cavity surfaces (not designated by reference numeral) extending from the second oblong cavity surface 211 toward the parting line are formed, and no rib forming cavity surfaces in the recessed shape to form rib portions are provided. With this configuration in which only the movable mold 200B has recessed cavity surfaces corresponding to the rib portions 120 and the stationary mold 200A has no recessed portions corresponding to the rib portions 200 in its cavity surface F1, the final casting (molded product) is likely to be left in the movable mold 200B when the movable mold 200B is separated from the stationary mold 200A.

At each rib forming cavity surface 220 of the movable mold 200B, a plurality of ejector pins 300 are provided. The ejector pins 300 are configured to be protrusible from and retractable into the rib forming cavity surface 220 in the optical axis direction (in the direction of movement of the movable mold 200B). To be more specific, the ejector pins 300 are arranged in a lengthwise-extending bottom surface of each furrow-like rib forming cavity surface 220 at definite spacings along the length of the rib forming cavity surface 220. With this configuration, the rib portions 120 of the solidified fθ lens 100 after the injection molding process are pushed by the ejector pins 300, so that the ID lens 100 can be pushed out and removed from the cavity surface F2 of the movable mold 200B without risking the possibility of scratching the oblong lens surfaces 111, 112 with the ejector pins 300.

Figure 7A:
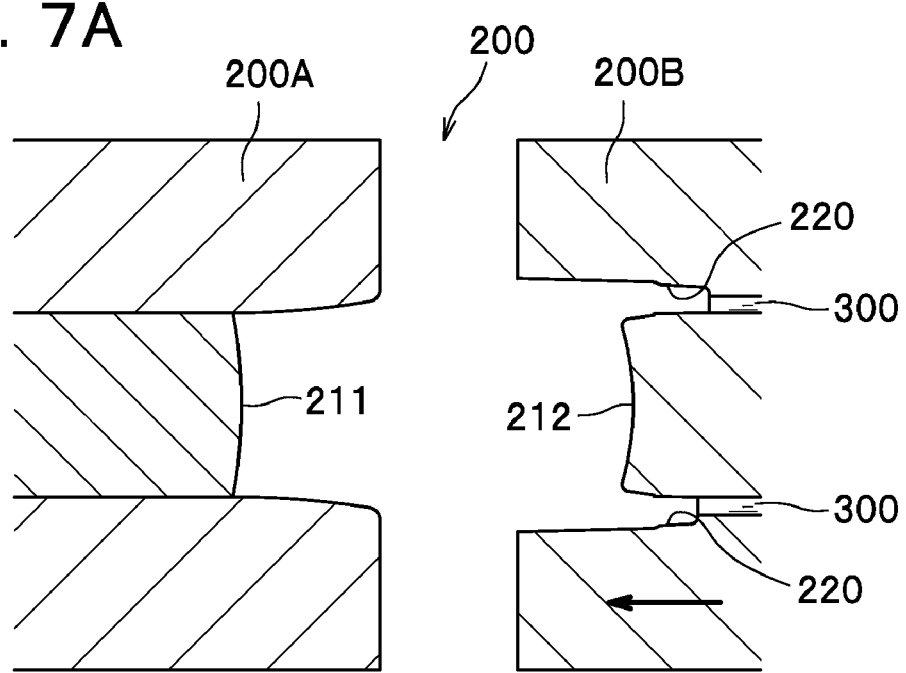
FIGS. 7A, 7B, 8A and 8B are sectional views for illustrating a method for manufacturing the fθ lens.

The injection molding process is performed by making use of the mold 200 as described above, in order to mold the fθ lens 100. More specifically, as shown in FIG. 7A, the movable mold 200B is first manipulated to move relative to the stationary mold 200A, and the molds 200A, 200B are combined together (first step).

Figure 7B:
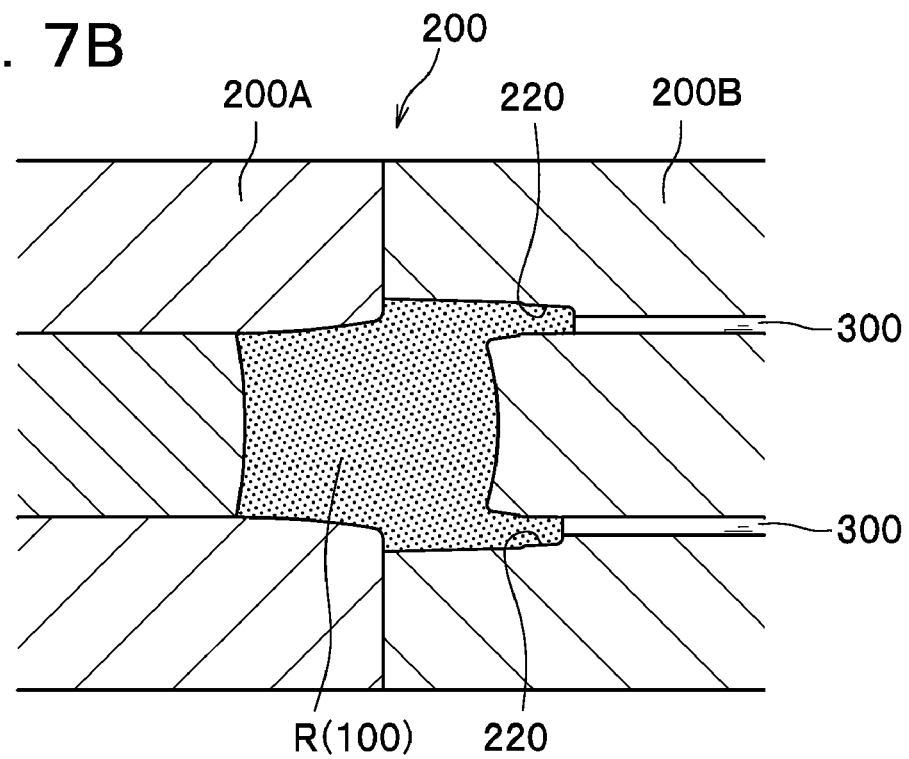

After the first step, as shown in FIG. 7B, molten resin material R is poured into the cavity C of the mold 200 (composed of the stationary mold 200A and movable mold 200B), and then let be solidified, so that the fθ lens 100 is molded (second step). After the second step, as shown in FIGS. 8A and 8B, the movable mold 200B is moved relative to the stationary mold 200A to open the mold 200, so that the molded fθ lens 100 is removed from the mold 200 (third step).

Figure 8A:
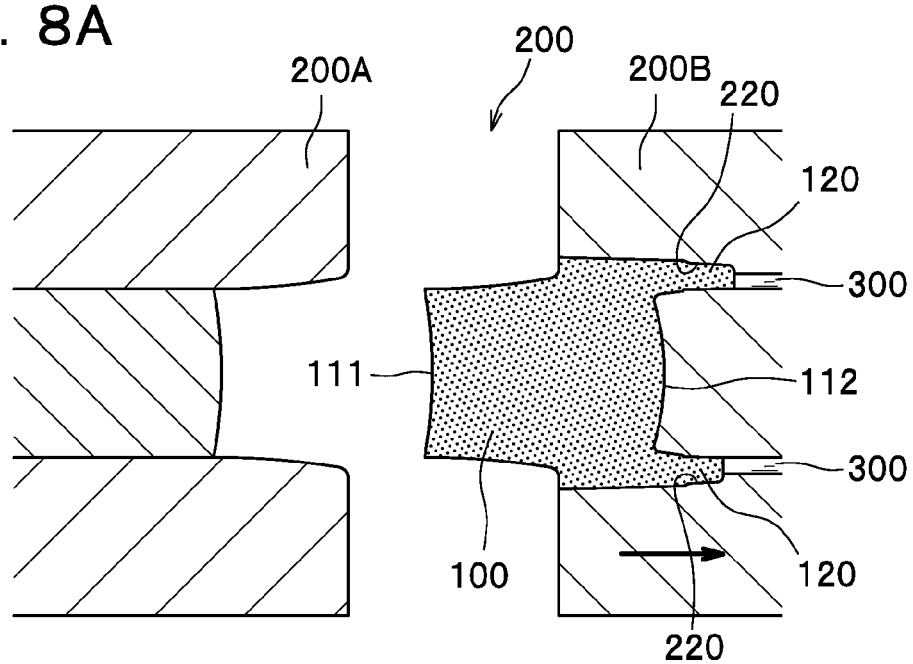
Figure 8B:
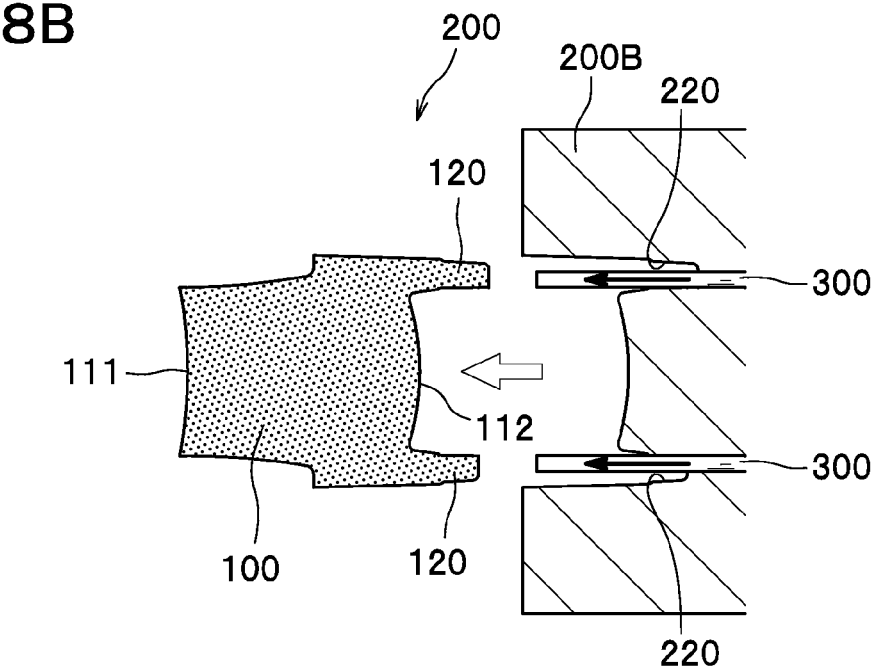

To be more specific, in the third step, when the movable mold 200B is separated from the stationary mold 200A, the solidified fθ lens 100 is seized by the recessed rib forming cavity surface 220 of the movable mold 200B as shown in FIG. 8A. In this way, the fθ lens 100 is left in the movable mold 200B. The fθ lens 100 left in the movable mold 200B is, as shown in FIG. 8B, pushed out of the movable mold 200B by the ejector pins 300 pushing the rib portions 120 of the fθ lens 100.

Thereafter, a portion corresponding to the gate G is trimmed off, and finally the fθ lens 100 as shown in FIG. 2 is made.

The lens (fθ lens 100) configured and the method for manufacturing the lens designed as described above have several advantageous effects as follow.

Since the slant surfaces 152, 162 are configured to slant at angles different from each other, the flowability of the molten resin material flowing through the cavity C1 corresponding to the first flange portion 150 having the first slant surface 152 slanting at the smaller angle θ1 can be improved. In addition, since the second flange portion 160 having the second slant surface 152 slanting at the greater angle θ2 is configured to have the dimension in the direction of the length of the fθ lens 100 smaller than that of the first flange portion 150, the fθ lens 100 as a whole can be designed to have a reduced dimension in the direction of the length thereof, so that the fθ lens 100 of miniature size can be realized. Furthermore, since the angles θ1, θ2 of the slant surface 152, 162 are different from each other, wrong assemblage of the fθ lens 100 can be prevented.

Since the gate G is formed at the flange outside cavity surface 253 of the cavity C1 having the first slant cavity surface 252 slanting at the smaller angle θ1, stagnation of the molten resin material at the entrance of the cavity C can be suppressed, so that the molten resin material can spread throughout the whole cavity C enough to insure the precision/accuracy of the lens surfaces of the molded fθ lens 100.

Since the gate G has a center G1 thereof located, as viewed in the longitudinal direction of the lens portion 110, in a position shifted away from the junction B of the first slant cavity surface 252 with the first oblong cavity surface 212 toward the second oblong cavity surface 211, the flow of the molten resin material passing through the center G1 of the gate G of which the velocity is the fastest is less obstructed by the junction B, and thus the flowability of the molten resin material is further improved.

Since the junction B of the first slant cavity surface 252 and the first oblong cavity surface 212 is curved, the flowability of the molten resin material can be increased in comparison with the configuration in which such a junction is not curved but angulated.

Although the illustrative embodiment of the present invention has been described above, the present invention is not limited to the above-described embodiments. Various modifications and changes may be made to the specific structures and arrangement without departing from the scope of the present invention.

In the above-described embodiment, each of the oblong lens surfaces 111, 112 is configured to be a convex surface that curves outward with a portion closer to a center in a direction of a length of the oblong lens surface 111, 112 being located farther toward outside than portions closer to both ends in the direction of the length of the oblong lens surface 111, 112. The present invention is, however, not limited to this specific configuration. The oblong lens surface consistent with the present invention may be configured to be a concave surface that curves inward with a portion closer to the center in the direction of the length of the oblong lens surface being located deeper toward inward than portions closer to the both ends in the direction of the length of the oblong lens surface. The configurations of the two oblong lens surfaces may be either symmetric or asymmetric. For example, the two opposite oblong lens surfaces may be configured such that one is a convex surface and the other is a concave surface.

In the above-described embodiment, the fθ lens 100 is described by way of example; however, the type of lens to which the present invention is applicable is not limited to the fθ lens. That is, any type of lens can be designed in accordance with the present invention as long as the lens includes a lens portion having two opposite oblong surfaces. For example, a long-length cylindrical lens may be designed in accordance with the present invention.

In the above-described embodiment, the both of the oblong lens surfaces 111, 112 are designed to be curved lens surfaces each having a refractive power. However, the present invention is not limited to this specific design, and if at least one of the oblong surfaces of the lens has a refractive power, the present invention may be applied advantageously thereto. For example, the oblong surfaces may be configured such that one is a curved lens surface and the other is a flat surface having no refractive power.

The stationary mold may not necessarily be immovably fixed in the mold, but may be configured to be movable relative to the movable mold to such an extent as not to depart from the concept of the present invention.

In the above-described embodiment, the gate G is illustrated by way of example as having a rectangular cross section, but the present invention is not limited to this specific configuration; for example, the gate having a circular or elliptic cross section may be adopted.

The method consistent with the present invention for manufacturing a lens may be any method without limitation as long as the method includes the steps of providing a mold having a cavity surface contoured to form the lens configured according to the present invention, and pouring a material, such as resin, glass, etc., into the mold, whereby the lens is molded.

The invention claimed is:

1. A lens comprising:
   a lens portion having two opposite oblong surfaces, at least one of which is a curved lens surface having a refractive power; and
   first and second flange portions provided at both ends in a longitudinal direction of the lens portion, each flange portion tapering toward the lens portion and having a slant surface slanting with respect to the longitudinal direction of the lens portion, the slant surface being connected with one of the oblong surfaces,
   wherein an angle of the slant surface of the first flange portion with respect to the longitudinal direction of the lens portion is different from an angle of the slant surface of the second flange portion with respect to the longitudinal direction of the lens portion.

2. A method for manufacturing a lens comprising the steps of:
   providing a mold having a cavity surface contoured to form the lens, the lens including a lens portion having two opposite oblong surfaces at least one of which is a curved lens surface having a refractive power, and first and second flange portions provided at both ends in a longitudinal direction of the lens portion, each flange portion tapering toward the lens portion and having a slant surface slanting with respect to the longitudinal direction of the lens portion, the slant surface being connected with one of the oblong surfaces, wherein the cavity surface of the mold includes a first slant cavity surface corresponding to the slant surface of the first flange portion of the lens and a second slant cavity surface corresponding to the slant surface of the second flange portion of the lens, and the first and second slant cavity surfaces form first and second angles, respectively, with respect to a longitudinal direction of a cavity corresponding to the lens portion, and the first and second angles are different from each other; and
   pouring a material for the lens into the mold, whereby the lens is molded.

3. The method according to claim 2, wherein the first angle formed by the first slant cavity surface is smaller than the second angle formed by the second slant cavity surface; and
   wherein the cavity surface of the mold further includes a flange outside cavity surface corresponding to an outside surface of the first flange portion facing outside in the longitudinal direction of the lens portion, and a gate for pouring the material into the mold is formed at the flange outside cavity surface.

4. The method according to claim 3, wherein the cavity surface of the mold further includes a first oblong cavity surface corresponding to the one of the oblong surfaces with which the slant surface is connected, and a second oblong cavity surface corresponding to the other of the oblong surfaces; and
   wherein the gate has a center thereof located, as viewed in the longitudinal direction of the cavity corresponding to the lens portion, in a position shifted away from a junction of the first slant cavity surface with the first oblong cavity surface toward the second oblong cavity surface.

5. The method according to claim 2, wherein the cavity surface of the mold further includes a first oblong cavity surface corresponding to the one of the oblong surfaces with which the slant surface is connected, and a junction of the first slant cavity surface with the first oblong cavity surface is curved.

* * * * *